(12) United States Patent
Hasegawa

(10) Patent No.: US 10,062,029 B2
(45) Date of Patent: Aug. 28, 2018

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventor: Masashi Hasegawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 598 days.

(21) Appl. No.: 14/614,479

(22) Filed: Feb. 5, 2015

(65) Prior Publication Data

US 2015/0227833 A1    Aug. 13, 2015

(30) Foreign Application Priority Data

Feb. 13, 2014    (JP) .................................. 2014-025223

(51) Int. Cl.
| | |
|---|---|
| G06N 5/02 | (2006.01) |
| G06F 11/36 | (2006.01) |
| G06F 9/445 | (2018.01) |
| G06F 11/07 | (2006.01) |

(52) U.S. Cl.
CPC ........... *G06N 5/02* (2013.01); *G06F 9/44589* (2013.01); *G06F 11/07* (2013.01); *G06F 11/36* (2013.01)

(58) Field of Classification Search
CPC .................... G06N 5/00; G06N 5/02
See application file for complete search history.

(56) References Cited

U.S. PATENT DOCUMENTS

| | | | | |
|---|---|---|---|---|
| 2006/0080582 A1* | 4/2006 | Lu | ...................... | G01R 31/2894 714/724 |
| 2009/0217341 A1* | 8/2009 | Sun | ...................... | H04L 63/0263 726/1 |
| 2014/0324892 A1* | 10/2014 | Tong | .................. | G06F 17/30867 707/754 |

FOREIGN PATENT DOCUMENTS

| | | |
|---|---|---|
| JP | 2010-211257 A | 9/2010 |
| JP | 2011-191823 A | 9/2011 |

\* cited by examiner

*Primary Examiner* — Vincent Gonzales
(74) *Attorney, Agent, or Firm* — Sughrue Mion, PLLC

(57) ABSTRACT

Provided is an information processing apparatus including a processing rule management section that manages plural continuous setting operations, which are set as processing rules for completing processing, by applying identification numbers to the processing rules at least some of which are changed, an executed operation information acquisition section that acquires executed operation information relating to operations executed for completing the processing in an order in which the executed operations are performed, and a determination section that determines if the executed operation information based on comparison between the acquired executed operation information and each of the setting operations in the plural processing rules managed by the processing rule management section is true or false.

11 Claims, 9 Drawing Sheets

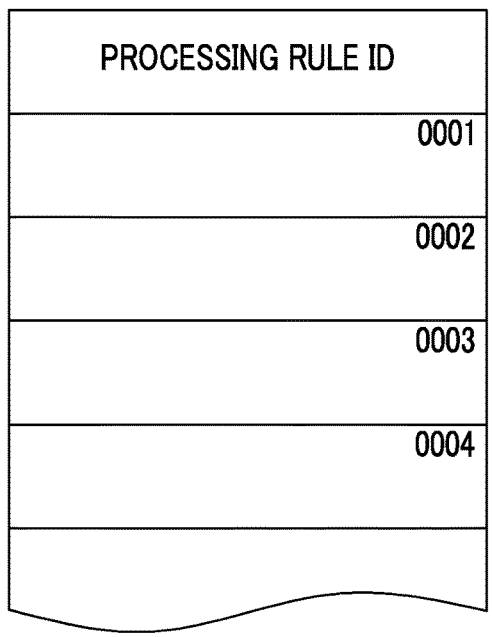

FIG. 6

| PROCESSING RULE VERSION ID | 0001-01 | | | |
|---|---|---|---|---|
| PROCESSING RULE SETTING OPERATION LIST | OPERATION No. | NEWEST OPERATION No. | PROCESSING RULE SETTING OPERATION | |
| | | | SETTING OPERATION | OPERATION TARGET |
| | 1 | 1 | FILE DOWNLOADING | APPLICATION Form A |
| | 2 | 2 | FILE SAVING | APPLICATION Form A |
| | 3 | – | FILE PRINTING | APPLICATION Form A |
| | 4 | – | FILE SCANNING | APPLICATION Form A |
| | 5 | 7 | MAIL SENDING | To: PERSON WHO IS IN CHARGE OF APPLICATION ATTACHMENT: APPLICATION Form A |

FIG. 7

| PROCESSING RULE ID | PROCESSING RULE VERSION ID | OPERATION ORDER | SETTING OPERATION | OPERATION IN NEWEST VERSION | OPERATION DATE AND TIME |
|---|---|---|---|---|---|
| 0002 | 0002-03 | 1 | A | | DATE AND TIME 1 |
| | | 2 | B | | DATE AND TIME 2 |
| | | 3 | C | | DATE AND TIME 3 |
| | | 4 | D | | |
| | | 5 | E | | |
| | 0002-02 | 1 | A | 1 | DATE AND TIME 1 |
| | | 2 | B | 2 | DATE AND TIME 2 |
| | | 3 | C | 3 | DATE AND TIME 3 |
| | | 4 | G | | DATE AND TIME 4 |
| | | 5 | H | | |
| | 0002-01 | 1 | A | 1 | DATE AND TIME 1 |
| | | 2 | B | 2 | DATE AND TIME 2 |
| | | 3 | C | 3 | DATE AND TIME 3 |
| | | 4 | K | | |
| | | 5 | L | | |

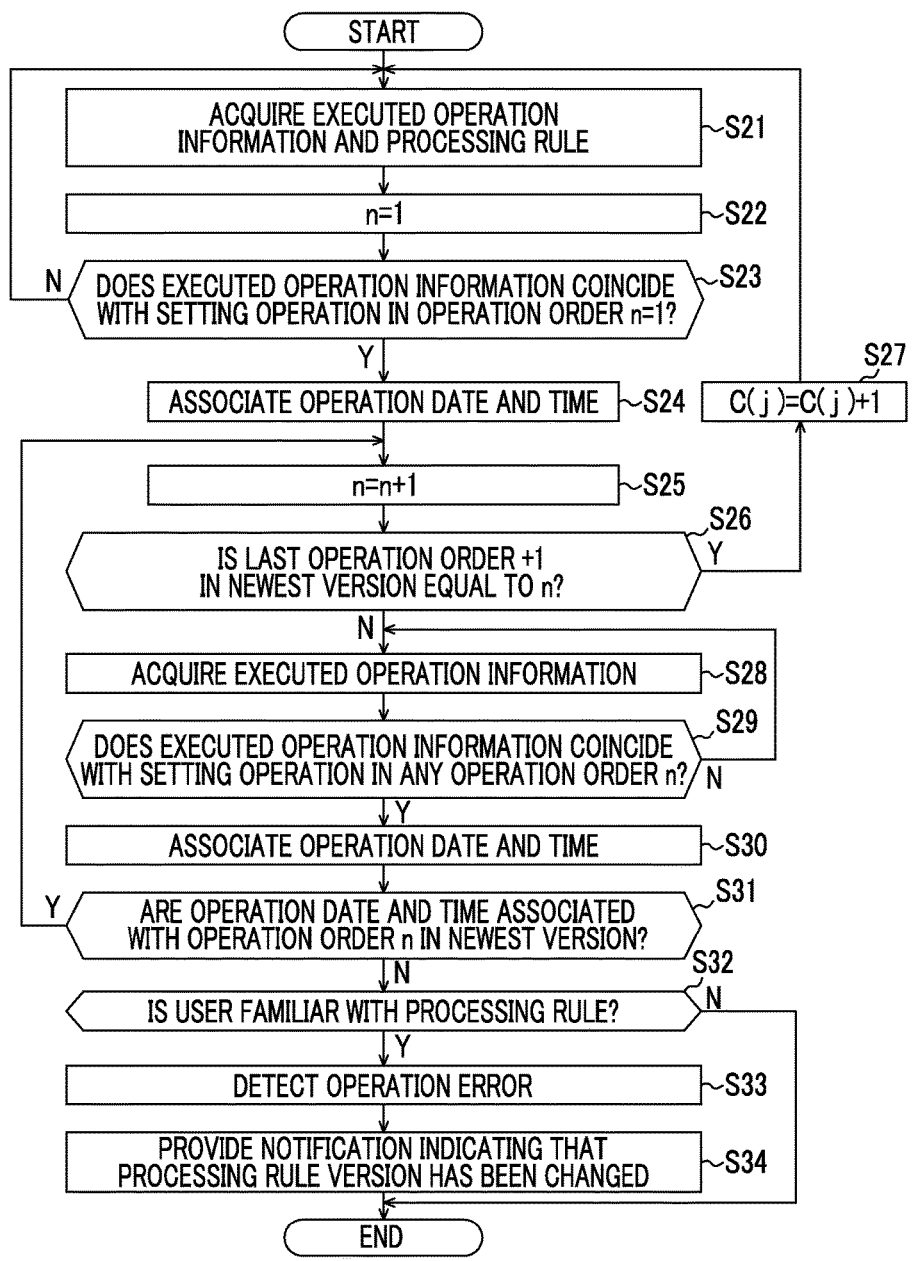

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2014-025223 filed Feb. 13, 2014.

BACKGROUND

Technical Field

The present invention relates to an information processing apparatus and a non-transitory computer readable medium storing a program.

SUMMARY

According to an aspect of the invention, there is provided an information processing apparatus including:

a processing rule management section that manages plural continuous setting operations, which are set as processing rules for completing processing, by applying identification numbers to the processing rules at least some of which are changed;

an executed operation information acquisition section that acquires executed operation information relating to operations executed for completing the processing in an order in which the executed operations are performed; and a determination section that determines if the executed operation information based on comparison between the acquired executed operation information and each of the setting operations in the plural processing rules managed by the processing rule management section is true or false.

BRIEF DESCRIPTION OF THE DRAWINGS

Exemplary embodiments of the present invention will be described in detail based on the following figures, wherein:

FIG. 4 is a diagram showing an example of a data structure in a processing rule list;

FIG. 5 is a diagram showing an example of a data structure of a processing rule;

FIG. 6 is a diagram showing an example of a data structure of a processing rule version;

FIG. 7 is a diagram showing an example of an operation status table;

FIG. 10 is a flowchart showing an example of a flow of operation error detection processing which is executed by the information processing apparatus according to the second exemplary embodiment.

DETAILED DESCRIPTION

First Exemplary Embodiment

Hereinafter, a detailed description will be given of a first exemplary embodiment of the invention with reference to drawings.

Figure 1:
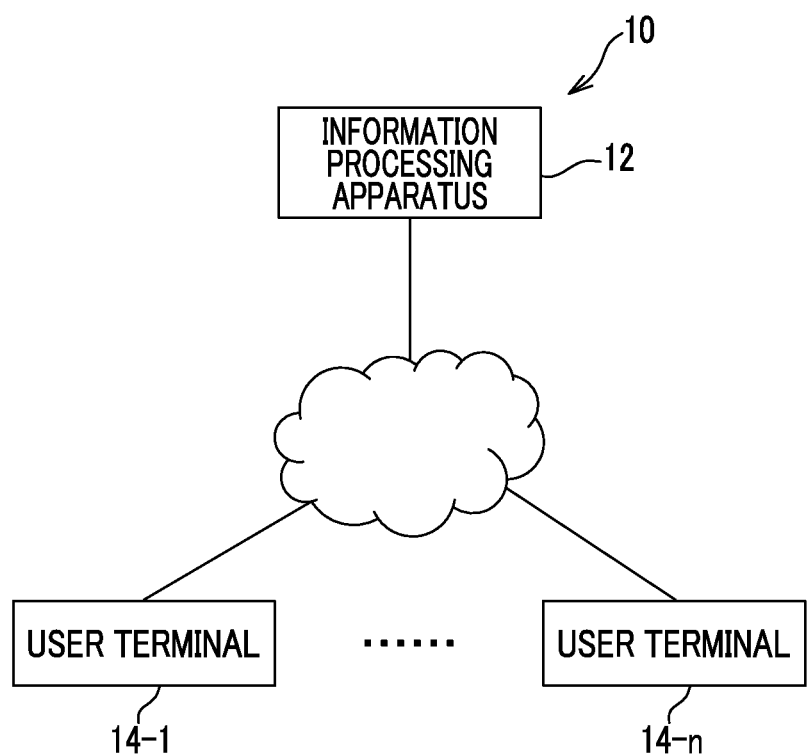
FIG. 1 is a diagram showing an example of an overall configuration of an information processing system according to a first exemplary embodiment of the invention.

FIG. 1 is a diagram showing an example of an overall configuration of an information processing system 10 according to the first exemplary embodiment of the invention. As shown in FIG. 1, the information processing system 10 according to the exemplary embodiment is provided with the information processing apparatus 12 and user terminals 14 (14-1 to 14-$n$). The information processing apparatus 12 and the terminals 14 are connected to a communication network such as a LAN or the Internet so as to communicate with each other.

The information processing apparatus 12 is provided with a control unit which is a program control device, such as a CPU, that operates in accordance with a program installed in the information processing apparatus 12, a storage unit which is a storage element such as a ROM or a RAM or a hard disk drive, and a communication unit which is a communication interface such as a network board, for example. These components are connected to each other via a bus. The storage unit in the information processing apparatus 12 stores a program which is executed by the control unit in the information processing apparatus 12. In addition, the storage unit in the information processing apparatus 12 also operates as a work memory of the information processing apparatus 12.

Each of the user terminals 14 is configured of a known personal computer which is provided with a control unit such as a CPU, a storage unit which is a storage element such as a ROM or a RAM or a hard disk drive, an output unit such as a display, an input unit such as a mouse or a keyboard, and a communication unit such as a network board, for example.

According to the exemplary embodiment, the information processing apparatus 12 manages a processing rule for processing which is executed by the terminals 14. The processing rule is a rule for a procedure of a series of operations for executing specific processing. For example, a processing rule in relation to processing for "approval of an application form A" is determined as a procedure of a series of operations from No. 1 to No. 5, that is, No. 1: downloading an application form A from a specific URL, No. 2: filling out and saving the application form A, No. 3: printing the application form A and affixing a seal of applicant data to an applicant field and affixing a seal of an approver to an approver field in the printed application form A, No. 4: scanning the sealed application form A, and No. 5: sending the scanned application form A to a person who is in charge of the application. Here, there is a case where such a processing rule is changed. For example, it is assumed that the operations No. 3 and No. 4 are changed as follows. That is, No. 3: affixing an electronic seal to the applicant field in the application form A, No. 4: sending the application form A to a superior, No. 5: affixing a seal of the superior to the approver field in the application form A, No. 6: sending the application form A from the superior to the applicant, and No. 7: sending the application form A to the person who is in charge of the application. If the processing rule is changed as described above, the information processing apparatus 12 newly saves and manages the changed processing rule. In addition, the processing rule is not limited to this example, and various processing rules may be determined.

Here, there is a case where one of the user terminals attempts to execute operations in accordance with a processing rule before a change regardless of the fact that the processing rule has been changed. The exemplary embodiment is configured to detect an operation error which is caused by executing operations in accordance with the processing rule before the change after the processing rule has been changed.

Figure 2:
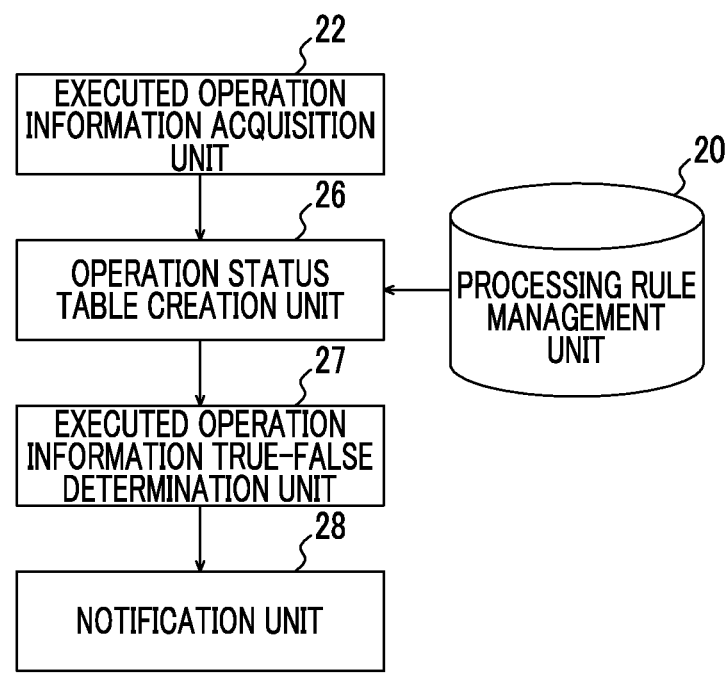
FIG. 2 is a functional block diagram showing main functions, which are executed by an information processing apparatus 12 according to the first exemplary embodiment, as examples.

FIG. 2 is a functional block diagram showing main functions, which are executed by the information processing apparatus 12 according to the first exemplary embodiment, as examples. As shown in FIG. 2, the information processing apparatus 12 according to the exemplary embodiment is functionally configured of a processing rule management unit 20, an executed operation information acquisition unit 22, an operation status table creation unit 26, an executed operation information true-false determination unit 27, and a notification unit 28. These functions are realized by the control unit executing the program stored on the storage unit. The program is supplied to the information processing apparatus 12 via a computer readable information storage medium such as an optical disc, a magnetic disk, a magnetic tape, a magnet-optical disc, or a flash memory or a communication network such as the Internet.

Figure 3:
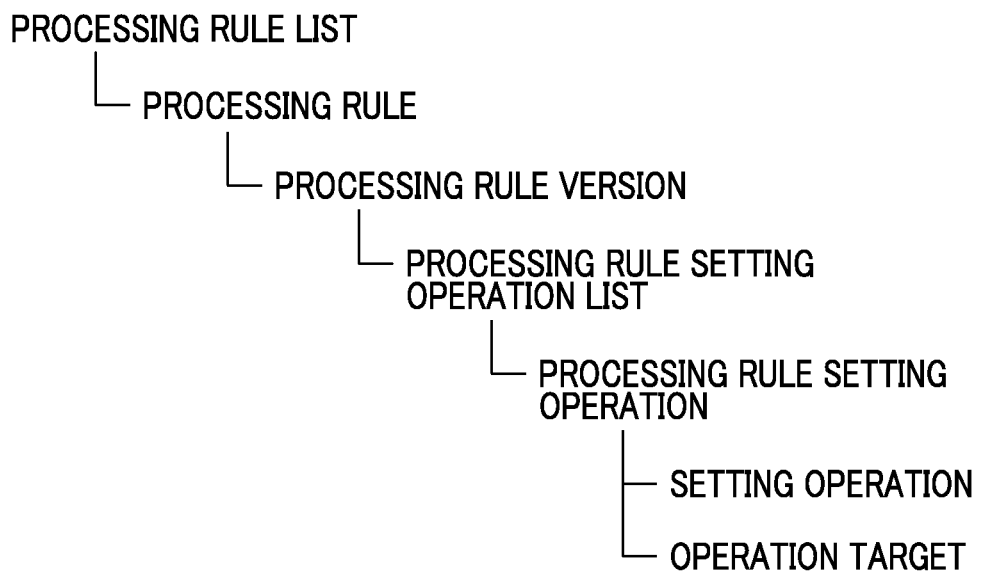
FIG. 3 is a diagram showing an example of a data structure in a processing rule management unit.

The processing rule management unit 20 manages various processing rules and change histories of the processing rules. Here, the processing rules may be set by the user terminals 14 and stored on the processing rule management unit 20. Alternatively, the processing rules may be set by the information processing apparatus 12 and stored in the processing rule management unit 20. FIG. 3 is a diagram showing an example of a data structure in the processing rule management unit 20. As shown in FIG. 3, the data structure in the processing rule management unit 20 includes elements such as a processing rule list, processing rules, processing rule versions, a processing rule setting operation list, and a processing rule setting operation.

The processing rule list includes the same number of processing rule IDs and processing rules saved therein. FIG. 4 shows an example of a data structure in the processing rule list. As shown in FIG. 4, four processing rules with processing rule IDs=0001 to 0004 are saved. Then, a processing rule ID is added every time a new processing rule is saved.

Each processing rule includes the name of the processing rule, the processing rule ID, and a processing rule version list. FIG. 5 shows an example of a data structure of a processing rule. In relation to the processing rule, each processing rule ID included in the processing rule list is associated with the name of the processing rule and a processing rule version list as shown in FIG. 5. In a specific example, the name of a processing rule corresponding to a processing rule ID=0001 is "A application", and two versions (processing rule version ID=0001-01 and processing rule version ID=0001-02) are present in the processing rule version list. In addition, a processing rule version ID is added every time the processing rule is changed and a processing rule version is newly saved. That is, the last processing rule version ID (0001-02 in the example shown in FIG. 5) corresponds to the newest processing rule version.

Each processing rule version includes a processing rule version ID and a processing rule setting operation list. FIG. 6 shows an example of a data structure of the processing rule version. In relation to the processing rule version, a processing rule setting operation list is associated with each processing rule version ID included in the processing rule version list as shown in FIG. 6. The processing rule setting operation list is for indicating a specific setting operation corresponding to each processing rule version ID. In a specific example, a processing rule setting operation list corresponding to the processing rule version ID=0001-01 (processing rule version 1 of a processing rule with a name of "A application") includes a series of five operations from an operation No. 1 to an operation No. 5. In addition, it is assumed that the processing rule setting list corresponding to a processing rule version ID=0001=02 (processing rule version 2 of a processing rule with the name of "A application"), which is not shown in the drawing, includes a series of operations from operation No. 1 to operation No. 7. Moreover, it is assumed that the operation Nos. 1, 2, and 7 in the series of operations from No. 1 to No. 7 for the processing rule version ID=0001-02 are the same setting operations as the operation Nos. 1, 2, and 5 in the series of operations for the processing rule version ID=0001-01. Here, the processing rule version with the processing rule version ID=0001-02 is the newest processing rule version. The processing rule setting operation list of the newest processing rule version is compared with the processing rule setting list of the old version (processing rule version ID=0001-01). If the same setting operations are present, operation numbers of the setting operations in the newest processing rule are stored on a "newest operation No." section in the processing rule setting operation list of the old version. In doing so, it is possible to grasp differences between the setting operations of the old version and the setting operations of the newest version. Here, in relation to all of the processing rules, operations to be changed when a new processing rule version is saved are operations from among the operation No. 2 and the following operations, and an operation No. 1 in each processing rule is different. That is, it is possible to know that the processing with the processing rule ID=0001 (processing of "A application" in this example) has been started based on the execution of the operation with the operation No. 1 in the processing rule with the processing rule ID=0001.

The executed operation information acquisition unit 22 acquires executed operation information, which indicates an operation, control, or the like executed by each user terminal 14, one by one from the user terminal 14 via the communication unit. The executed operation information includes an executed operation, operation date and time, and a terminal ID for identifying the user terminal 14 which executed the operation. The executed operation information is created by the control unit in the user terminal 14 every time the user terminal 14 executes an operation and is transmitted to the information processing apparatus 12 via the communication unit. In addition, the executed operation information may be created by the control unit in the information processing apparatus 12.

The operation status table creation unit 26 creates an operation status table which indicates an operation status of a specific user terminal 14 based on the executed operation information which is acquired by the executed operation information acquisition unit 22 and the processing rule list stored in the processing rule management unit 20. FIG. 7 is a diagram showing an example of the operation status table. As shown in FIG. 7, a processing rule ID, a processing rule version ID, an operation order, a setting operation, and operation date and time are associated in the operation status table. Here, if the executed operation included in the executed operation information which is acquired by the executed operation information acquisition unit 22 is based on the processing rule stored on the processing rule management unit 20, the operation date and time of the corresponding executed operation information is associated with the corresponding setting operation in the operation status table. If plural processing rule IDs are stored, an operation status table is created for each of the processing rule IDs.

The executed operation information true-false determination unit 27 determines if the executed operation included in the executed operation information which is acquired by the executed operation information acquisition unit 22 is true or false, based on the operation status table created by the operation status table creation unit 26. Here, an operation, which is executed based on a processing rule version before change, after the processing rule version has been changed is determined to be false (hereinafter, referred to as an operation error). By creating the operation status table as shown in FIG. 7, it is possible to detect information about an operation executed based on the processing rule before the change instead of the processing rule of the newest version.

The notification unit 28 outputs, to the corresponding user terminal 14, notification indicating that the executed operation, which is determined to be an operation error by the executed operation information true-false determination unit 27, causes an operation error. Here, the notification unit 28 provides notification indicating that the operation error occurred due to the change in the processing rule version.

Here, a description will be given of an example of a flow of the operation error detection processing executed by the information processing apparatus 12 according to the first exemplary embodiment with reference to the flowchart in FIG. 8.

The operation error detection processing is executed every time the executed operation information acquisition unit 22 acquires executed operation information relating to an operation executed by the user terminal 14-*n* (the user terminal 14-1, for example), based on the executed operation. In addition, the processing rule management unit 20 stores plural processing rules in advance.

First, the operation status table creation unit 26 acquires the executed operation information which is acquired by the executed operation information acquisition unit 22 and the processing rule stored in the processing rule management unit 20 (S1). Then, the operation status table creation unit 26 sets an initial value 1 for an operation order n (S2) and determines whether or not the setting operation of the operation order n=1 included in the processing rule acquired in Processing S1 coincides with the executed operation included in the executed operation information which is acquired in Processing S1 (S3).

If it is determined as a result of Processing S3 that the setting operation of the operation order n=1 does not coincide with the executed operation included in the executed operation information, the operation status table creation unit 26 repeats Processing S1 and the following processing. If it is determined as a result of Processing S3 that the setting operation of the operation order n=1 coincides with the executed operation included in the executed operation information, the operation status table creation unit 26 associates the operation order n=1 in the processing rule which includes the coincident setting operation of the operation number n=1 with operation date and time included in the executed operation information which is acquired in Processing S1 (S4).

Here, a specific description will be given with reference to the operation status table shown in FIG. 7. If it is assumed that the executed operation information which is acquired by the operation status table creation unit 26 is described as (an executed operation, operation date and time), then the executed operation information which is acquired in Processing S1 is described as (A, date and time 1). In addition, it is determined whether or not a setting operation of an operation order n=1 in three processing rule versions (in this example, 0002-03, 0002-02, and 0002-01 correspond thereto, and 0002-03 is the newest processing rule version) included in the processing rule with the processing rule ID=0002 coincides with the executed operation included in the executed operation information (A, date and time 1) which is acquired in Processing S1. Since the setting operation of the operation order n=1 in each processing rule version is the same, it is only necessary to make a comparison with any one of the setting operations of an operation order n=1. Since both the executed operation and the setting operation are A and coincide with each other in this example, the operation status table creation unit 26 associates 0002-03, 0002-02, and 0002-01 with the date and time 1.

Next, the operation status table creation unit 26 adds one to the operation order n (S5). Then, the operation status table creation unit 26 determines whether or not a value obtained by adding one to the operation order of the last setting operation in the newest version coincides with n (S6).

If it is determined as a result of Processing S6 that the value obtained by adding one to the operation order of the last setting operation in the newest version coincides with n, Processing S1 and the following processing are executed. If it is determined as a result of Processing S6 that the value obtained by adding one to the operation order of the last setting operation in the newest version does not coincide with n, the next executed operation information is acquired from the executed operation information acquisition unit 22 (S7). The operation status table creation unit 26 determines whether or not the executed operation included in the executed operation information which is acquired in Processing S6 coincides with the setting operation of the operation order n in any of the processing rule versions (S8).

If it is determined as a result of Processing S8 that the executed operation included in the executed operation information acquired in Processing S6 does not coincide with the setting operation of the operation order n in any of the processing rule versions, the operation status table creation unit 26 repeats Processing S7 and the following processing. In such a case, the operation status table creation unit 26 determines that the executed operation included in the executed operation information which is acquired in Processing S7 is an operation which is not related to the processing rule, and acquires the next executed operation information.

If it is determined as a result of Processing S8 that the executed operation included in the executed operation information acquired in Processing S6 coincides with the setting operation of the operation order n in any of the processing rule versions, the operation status table creation unit 26 associates the operation order n in the processing rule version, which has been determined to include the executed operation coincident with the setting operation of the operation order n, with the operation date and time included in the executed operation information which is acquired in Processing S7 (S9).

Then, the executed operation information true-false determination unit 27 determines whether or not the operation date and time are associated with the operation order n in the newest version (S10).

If it is determined as a result of Processing S10 that the date and time are associated with the operation order n in the newest version, the operation status table creation unit 26 repeats Processing S5 and the following processing. In addition, the processing rule versions which are not associated with the operation date and time in Processing S8 are excluded in Processing S5 and the following processing.

If it is determined as a result of Processing S10 that the date and time are not associated with the operation order n in the newest version, the executed operation information true-false determination unit 27 determines that the executed operation included in the executed operation information acquired by the operation status table creation unit 26 in Processing S7 is erroneously performed (S11). That is, if the operation date and time is not associated with the operation order n (n>1) in the operation status table in the newest version and the operation time and date is associated with the operation order in the operation status table in the old version, the executed operation information true-false determination unit 27 determines that the executed operation corresponding to the operation date and time is erroneously performed.

Specifically, since the executed operations included in the executed operation information acquired by the operation status table creation unit 26 from the executed operation information acquisition unit 22 up to the operation order n=3 coincide with setting operations in all the processing rule versions in the operation status table shown in FIG. 7, the operation date and time are associated with the operation orders in the respective processing rule versions. Then, the executed operation information acquired by the operation status table creation unit 26 from the executed operation information acquisition unit 22 in the operation order n=4 corresponds to (G, time and date 4). Here, the executed operation "G" coincides with the setting operation in the operation order n=4 in the processing rule version with the processing rule version ID=0002-02 and does not coincide with the setting operations in the operation order n=4 in the processing rule versions with the processing rule version IDs=0002-01 and 0002-03. Therefore, "date and time 4" is associated with the operation order n=4 in the processing rule version with the processing rule version ID=0002-02. In addition, since the operation date and time are not associated with the operation order n=4 in the newest processing rule version (0002-03) and are associated with the operation order n=4 of the previous processing rule version (0002-02) before the newest processing rule version, the operation status table creation unit 26 determines that the executed operation "G" included in the executed operation information (G, date and time 4) acquired from the executed operation information acquisition unit 22 in the operation order n=4 is erroneously performed. In doing so, a state in which the user terminal 14-1 attempts to execute processing based on the processing rule in the processing rule version before the change regardless of the change of the processing rule version is detected.

Then, the notification unit 28 provides notification, which indicates that the operation executed by the user terminal 14-1 is erroneously performed or that the processing rule version has been changed, to the user terminal 14-1 (S12) and completes the operation error detection processing. In doing so, the notification indicating that the processing rule version has been changed is provided to the user who does not know that the processing rule version has been changed and attempts to execute the operation in accordance with the processing rule in the processing rule version before the change.

Second Exemplary Embodiment

Figure 9:
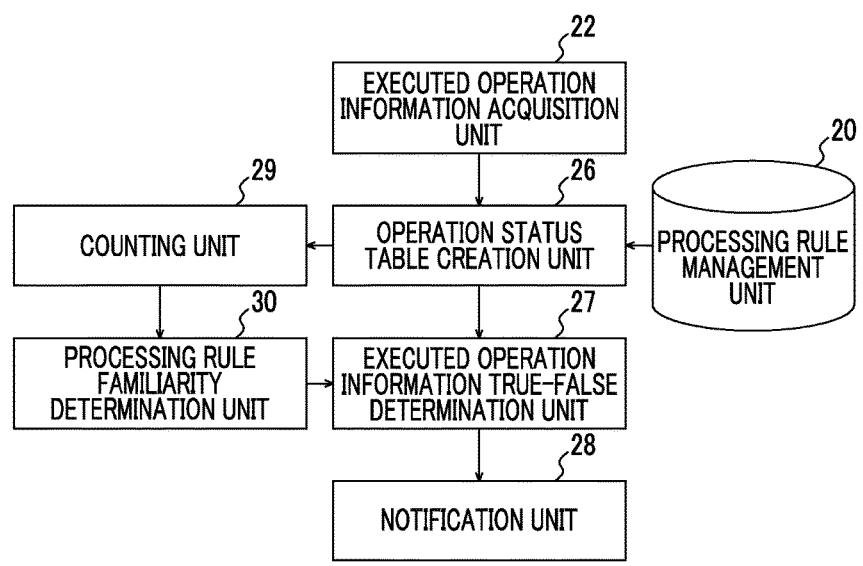
FIG. 9 is a functional block diagram showing main functions, which are executed by an information processing apparatus according to a second exemplary embodiment, as examples.

A second exemplary embodiment is configured to enable detection of an operation error with higher precision due to the information processing apparatus 12 executing operation error detection processing based on degrees of familiarity of each user with processing rules. FIG. 9 is a functional block diagram showing main functions, which are executed by a control unit in the information processing apparatus 12 according to the second exemplary embodiment, as examples. Configurations according to the second exemplary embodiment are the same as those of the first exemplary embodiment other than that a counting unit 29 and a processing rule familiarity determination unit 30 are provided. Therefore, the same reference numerals are given to the same configurations as those in the first exemplary embodiment, and the descriptions thereof will not be repeated.

The counting unit 29 counts the number of times a series of processing is completed in the newest processing rule version at timing when the processing is performed, for each user who executes the processing. The storage unit stores a counter $C(j)$, which indicates the number of times the series of processing is completed, based on a processing rule version ID=j. An initial value of the counter $C(j)$=0, and the counting unit 29 increments the counter $C(j)$ of the user who performs the processing by one every time the series of processing is completed, based on the processing rule version ID=j until the processing rule is newly updated. Then, if the processing rule is updated, the counting unit 29 increments by one the counter $C(j+1)$ of the user who performs the processing in the newest processing rule version with a processing rule version ID=j+1. Even if the processing rule version is updated, the counter $C(j)$ for the previous processing rule version ID=j before the newest processing rule version ID=j+1 is not deleted and is stored as it is.

The processing rule familiarity determination unit 30 determines the familiarity of the user with the processing rule of the processing rule version ID=j, based on the value of the counter $C(j)$ accumulated by the counting unit 29. Specifically, the processing rule familiarity determination unit 30 determines that the user is familiar with the processing rule of the processing rule version ID=j when the value of the counter $C(j)$ is equal to or greater than a predetermined value (equal to or greater than five, for example).

Here, a description will be given of an example of a flow of the operation error detection processing which is executed by the information processing apparatus 12 according to the second exemplary embodiment with reference to the flowchart in FIG. 10.

Figure 8:
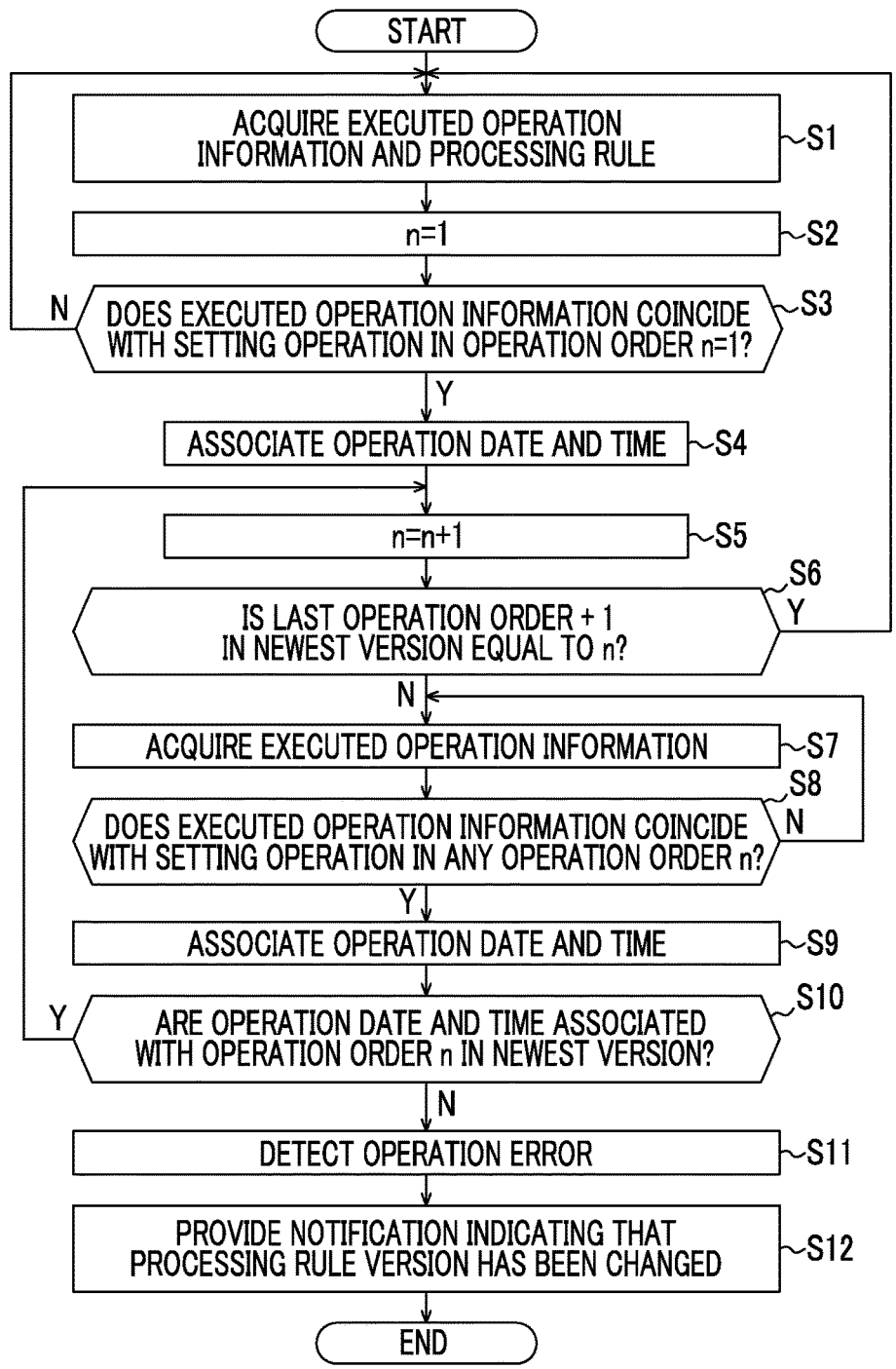
FIG. 8 is a flowchart showing an example of a flow of operation error detection processing which is executed by the information processing apparatus according to the first exemplary embodiment.

First, the processing in S21 to S25 is the same as the processing in S1 to S5 in the flowchart shown in FIG. 8. For this reason, the repeated descriptions thereof will be omitted here.

In Processing S26, the operation status table creation unit 26 determines whether or not a value obtained by adding one to an operation order of the last setting operation in the newest version coincides with n. If it is determined that the value obtained by adding one to the operation order of the last setting operation coincides with n, the counting unit 29 adds one to the counter $C(j)$ in the newest version of the user who performs the processing (S27).

In addition, the processing in S28 to S31 is the same as the processing in S7 to S10 in the flowchart shown in FIG. 8. For this reason, the repeated descriptions thereof will be omitted here.

In Processing S32, the processing rule familiarity determination unit 30 determines the familiarity of the user with the processing rule in the processing rule version with which the operation date and time are associated. Then, if the processing rule familiarity determination unit 30 determines that the user is familiar with the processing rule in the processing rule version with which the operation date and time are associated, the executed operation information true-false determination unit 27 determines that the executed operation corresponding to the operation date and time is erroneously performed (S33). Then, if the processing rule familiarity determination unit 30 determines that the user is not familiar with the processing rule version with which the operation date and time are associated, the executed operation information true-false determination unit 27 does not detect the executed operation corresponding to the operation date and time as an operation error and completes the operation error detection processing. In addition, the processing in S34 is the same as the processing in S12 in the flowchart shown in FIG. 8. Therefore, the overlapping description will be omitted here.

With the above configuration, the state in which the user who uses the user terminal 14-1 attempts to execute the processing based on the processing rule of the processing rule version before the change regardless of the change in the processing rule version is determined based on the familiarity of the user with the processing rule version before the change. That is, in a case where the user is not familiar with the processing rule version before the change even if the user executes the operation included in the processing rule version, it is determined that the user intentionally executes the operation instead of erroneously executing the operation based on the processing rule version before the change without knowing that the processing rule has changed, and the operation is not determined to be erroneously performed. In a case where the user executes the operation included in the processing rule version before the change and the user is familiar with the processing rule version, the executed operation information true-false determination unit 27 determines that the user executes the processing based on the processing rule of the processing rule version before the change without knowing that the processing rule has been changed and determines that the operation is erroneously performed.

In addition, the processing of determining if the executed operation information by the executed operation information true-false determination unit 27 is true or false is not limited thereto. For example, the processing rule familiarity determination unit 30 may determine the familiarity of each user with processing rules in the processing rule version with which the operation date and time is associated by the operation status table creation unit 26 and in another processing rule version in Processing S32. If the processing rule familiarity determination unit 30 determines that the user is familiar with a processing rule in another processing rule version and determines that the user is not familiar with the processing rule in the processing rule version with which the operation date and time are associated by the operation status table creation unit 26, then the executed operation information true-false determination unit 27 may not determine that the executed operation corresponding to the operation date and time is erroneously performed. In doing so, the executed operation information true-false determination unit 27 determines that an operation is executed based on the processing rule version of the processing rule with which the user is not familiar instead of the processing version of the processing rule with which the user is familiar before the processing rule is changed. Such an operation is determined not to be an operation which the user attempts to execute based on the processing rule before the change without knowing that the processing rule has been changed, and the executed operation information true-false determination unit does not determine that the operation is erroneously performed.

The invention is not limited to the aforementioned exemplary embodiments.

Although the example in which the information processing apparatus 12 and the user terminals 14 are configured as separate apparatuses is described, the apparatuses may be configured as an integral apparatus, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to execute:
   a processing rule management section configured to manage a plurality of processing rules by applying identification numbers to the processing rules, each one of the plurality of processing rules including a plurality of operational steps required to be executed to complete execution of the processing rule, at least some of the processing rules having been updated;
   an executed operation information acquisition section configured to acquire executed operation information including operational steps executed for completing processing in an order in which the executed operational steps are performed, the executed operation information being acquired from a user terminal executing a processing rule including the executed operational steps; and
   a determination section configured to determine whether the executed operation information, based on comparison between the acquired executed operation information and each of the operational steps in the plurality of processing rules managed by processing rule management section, is true or false,
wherein the determination section is configured to determine whether the processing rule executed by the user terminal is an outdated processing rule according to a result of the determination whether the executed operation information is true or false.

2. The information processing apparatus according to claim 1,
wherein the determination section is configured to, in response to the acquired executed operation information not coinciding with the operational step corresponding to a newest processing rule and the executed operation information coinciding with the operational step corresponding to a processing rule other than the newest operation rule, determine that the executed operation information is false.

3. The information processing apparatus according to claim 2, wherein the processor is further configured to execute:
 a counting section configured to count a number of times the predetermined processing is completed in accordance with the processing rule, for each user who executes the processing,
 wherein the determination section is configured to, in response to the acquired executed operation information not coinciding with the operational step corresponding to the newest processing rule, the executed operation information coinciding with the operational step corresponding to a processing rule other than the newest processing rule, and the number of times that the processing based on the coincident processing rule is completed by the user being equal to or greater than a predetermined value, determine that the executed operation information is false.

4. The information processing apparatus according to claim 2, wherein the processor is further configured to execute:
 a notification section configured to provide a first notification to the user terminal, the first notification indicating that the executed operation is erroneously performed in response to the determination section determining that the processing rule executed by the user terminal is the outdated processing rule.

5. The information processing apparatus according to claim 4, wherein the processor is further configured to execute:
 a counting section configured to count a number of times the predetermined processing is completed in accordance with the processing rule, for each user who executes the processing,
 wherein the determination section is configured to, in response to the acquired executed operation information not coinciding with the operational step corresponding to the newest processing rule, the executed operation information coinciding with the operational step corresponding to a processing rule other than the newest processing rule, and the number of times that the processing based on the coincident processing rule is completed by the user being equal to or greater than a predetermined value, determine that the executed operation information is false.

6. The information processing apparatus according to claim 4,
 wherein the notification section is configured to provide a second notification to the user terminal, the second notification indicating that the processing rule has been updated in response to the determination section determining that the processing rule executed by the user terminal is the outdated processing rule.

7. The information processing apparatus according to claim 6, wherein the processor is further configured to execute:
 a counting section configured to count a number of times the predetermined processing is completed in accordance with the processing rule, for each user who executes the processing,
 wherein the determination section is configured to, in response to the acquired executed operation information not coinciding with the operational step corresponding to the newest processing rule, the executed operation information coinciding with the operational step corresponding to a processing rule other than the newest processing rule, and the number of times that the processing based on the coincident processing rule is completed by the user being equal to or greater than a predetermined value, determine that the executed operation information is false.

8. The information processing apparatus according to claim 1, wherein the processor is further configured to execute:
 a counting section configured to count a number of times the predetermined processing is completed in accordance with the processing rule, for each user who executes the processing,
 wherein the determination section is configured to determine, in response to the acquired executed operation information not coinciding with the operational step corresponding to the newest processing rule, the executed operation information coinciding with the operational step corresponding to a processing rule other than the newest processing rule, and the number of times that the processing based on the coincident processing rule is completed by the user being equal to or greater than a predetermined value, determine that the executed operation information is false.

9. The information processing apparatus according to claim 1, wherein the executed operation information comprises the executed operational steps, operation date and time, and a terminal ID, the terminal ID being associated with the user terminal from which the executed operation information is acquired.

10. The information processing apparatus according to claim 1, wherein an update of the processing rule executed by the user terminal includes an addition of a new operational step to the processing rule or a deletion of an existing operational step from the processing rule.

11. A non-transitory computer readable medium storing a program causing a computer to function as:
 a processing rule management section configured to manage a plurality of processing rules by applying identification numbers to the processing rules, each one of the plurality of processing rules including a plurality of operational steps required to be executed to complete execution of the processing rule, at least some of the processing rules having been updated;
 an executed operation information acquisition section configured to acquire executed operation information including operational steps executed for completing processing in an order in which the executed operational steps are performed, the executed operation information being acquired from a user terminal executing a processing rule including the executed operational steps; and
 a determination section configured to determine whether the executed operation information, based on comparison between the acquired executed operation information and each of the operational steps in the plurality of processing rules managed by the processing rule management section, is true or false,
 wherein the determination section is configured to determine whether the processing rule executed by the user terminal is an outdated processing rule according to a result of the determination whether the executed operation information is true or false.

* * * * *